Sept. 25, 1951          C. PETTERSON          2,569,334
MEANS FOR CONTROLLING IONIC VALVES
Filed Jan. 25, 1951
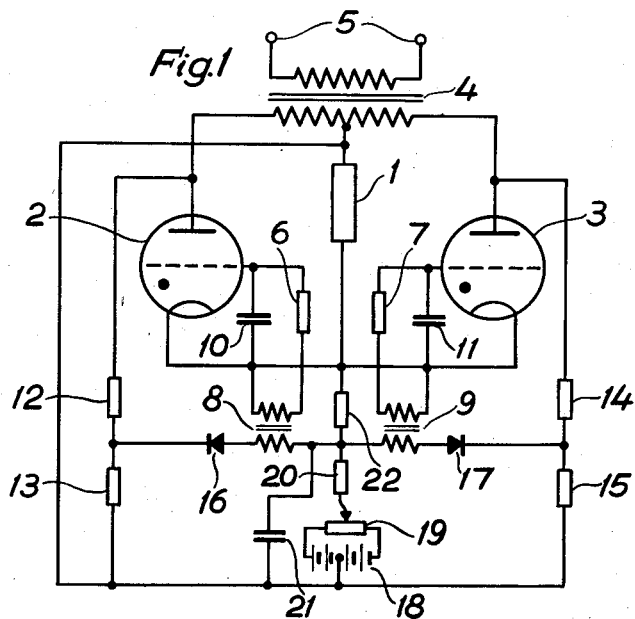
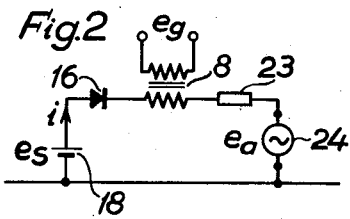
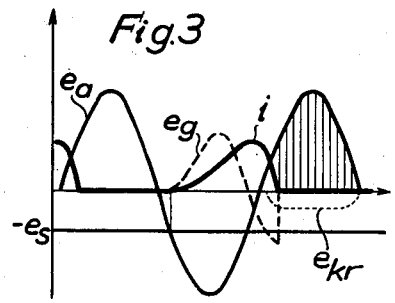 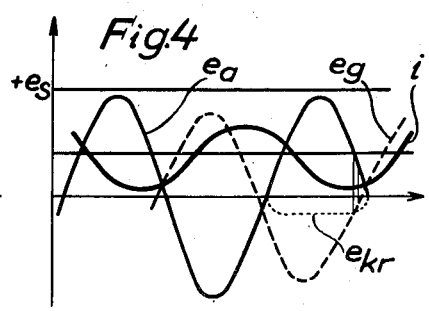
Inventor
Carl Petterson
By
Attorney.

Patented Sept. 25, 1951

2,569,334

UNITED STATES PATENT OFFICE 2,569,334

MEANS FOR CONTROLLING IONIC VALVES

Carl Petterson, Vasteras, Sweden, assignor to Allmänna Svenska Elektriska Aktiebolaget, Vasteras, Sweden, a Swedish corporation Application January 25, 1951, Serial No. 207,792 In Sweden December 9, 1949

1 Claim. (Cl. 315—272)

The present invention relates to means for grid-control of ionic valves, commonly known as gas or vapor discharge valves, by adjustment of the firing point of the valve.

Ionic valves have become widely used as a means in regulator applications. In particular they have proved to be valuable for controlling direct-current motors fed from an alternating-current supply. The A. C. voltage is usually rectified by one or more ionic valves and by means of grid-control the firing point may be varied in such a way that an arbitrary portion of the positive half-cycle of the applied voltage is supplied to the load. In said case either the armature or the field circuit or both are connected to the rectified voltage.

Many different methods of controlling ionic valves by grid-control are previously known. The most common ones apply some kind of adjustable phase-shifting of the A. C. grid-voltage with respect to the anode-supply voltage which method, in connection with a superposed, possibly adjustable D. C. grid-voltage, determines the firing point of the ionic valve. The known devices, however, necessitate a rather extensive equipment for this purpose including expensive elements as thermionic tube amplifiers.

A perfect and reliable device for controlling ionic valves may easily be obtained by the present invention. The main feature of the invention is that the control-grid is connected to the cathode via the secondary winding of a grid transformer, the primary winding of which, in series with a rectifier valve and an adjustable D. C. voltage, is connected to a voltage proportional to the applied alternating supply voltage.

In the accompanying drawing an embodiment of the invention is shown, applied to voltage regulation of a load, using two ionic valves. Figure 1 shows a diagram for this purpose, Figure 2 shows the fundamental circuits for the grid-control, and the Figures 3 and 4 show diagrams, representing long and short conduction time respectively of an ionic valve.

In Figure 1 an arbitrary load is represented by 1, for instance, the armature of a D. C. motor. One terminal of the load is connected to the cathodes of two parallel-connected ionic valves 2, 3. The other terminal of the load is connected to a center-tapping of a transformer 4 connected to an A. C. supply at 5. The end terminals of the secondary winding are connected to the anodes of the ionic valves 2, 3 respectively. The grid of each valve is connected to the cathodes over two circuits, one containing a resistor 6, 7 in series with the secondary winding of a transformer 8, 9, and one containing a capacitor 10, 11. The primary winding of said transformer 8, 9 is fed from the A. C. supplied to each valve, through the agency of a voltage divider 12, 13 and 14, 15 respectively. In series with the primary winding a rectifier valve 16, 17 is arranged and in the same circuit a D. C. voltage is superposed. The D. C. voltage is shown to be derived from a battery 18 and is adjustable by means of a rheostat 19. This voltage supply in series with a resistor 20 forms a common branch of the two circuits which includes the primary winding of said grid transformer 8, 9. In parallel with said common branch a smoothing capacitor 21 is connected. A resistor 22 is inserted in order to influence the regulation of the voltage across the load 1.

Figure 2 shows a simplified diagram of the circuit through the primary winding of each grid transformer, by way of example the transformer 8 of the left valve of Figure 1. The primary winding of said transformer 8 is connected in series with the rectifier valve 16, the D. C. current supply 18, which has positive direction according to the symbol in the figure, the total ohmic resistance 23 of the circuit, and the A. C. supply 24, the voltage of which is obtained from the anode-supply voltage of the valve 2 by means of the votlage divider 12, 13.

In the Figures 3 and 4 the current and voltage functions for the valves are illustrated, in Figure 3 for nearly maximum conduction time, and in Figure 4 for nearly blocked condition. In each figure the abscissa represents the time axis, the curve $e_a$ represents the voltage across the resistor 13 (15), the curve $i$ represents the current in the circuit according to Figure 2, the curve $e_g$ is the voltage induced in the secondary winding of the transformer 8 (9), the curve $e_{kr}$ is the minimum grid voltage for firing the ionic valve 2 (3), and finally $e_s$ is the D. C. voltage superposed in the circuit according to Figure 2, with rheostat 19 arranged to control the firing point. The vertically hatched area of the positive half-cycle of the applied voltage represents the conduction time of the ionic valve.

By using two ionic valves in the shown connection it is possible to keep one of the valves conducting during one of the half-cycles of the applied voltage and the other valve conducting during the subsequent half-cycle.

If the conditions according to Figure 3 are regarded, it is obvious that in order to obtain long conduction time for the ionic valve, a negative control voltage $e_s$ has to be superposed. The A. C. voltage $e_a$, proportional to the supply voltage of the anodes, the source of which is denoted by 24 in Figure 2, will then block the circuit during the positive half-cycle. Only when the instantaneous value of the anode-supply voltage is less than $e_s$, current is admitted to traverse the circuit, and the current will follow a curve $i$ according to the figure. This current will induce a voltage $e_g$ in the secondary winding, and when the instantaneous value of this voltage exceeds the critical grid-voltage of the ionic valve, such a potential will be given to the grid that the valve fires. A further displacement of the D. C. voltage $e_s$ in the negative direction will cause earlier firing of the ionic valve.

In order to delay the conduction of the ionic valve the voltage from the D. C. source 18 has to be adjusted to a value nearer to or larger than zero, and for an extreme, positive value this is represented by Figure 4. The rectifier valve 16 will in this case not be blocking, and the current wave $i$ may be fully developed. The current will induce the voltage $e_g$ in the grid-circuit and when this voltage exceeds the critical conduction voltage, the ionic valve in question will fire.

I claim as my invention:

A device for grid-control of ionic valves by adjusting the firing point of the valves, comprising two ionic valves, a grid transformer for each valve, the secondary winding of each of said transformers being connected between the grid and the cathode of the ionic valves respectively, a circuit for each ionic valve including the primary winding of said transformer, a rectifier element in said circuit in series with said primary winding, a common branch of said circuits, a source of direct current in said common branch, means for adjusting the voltage of said current source, means supplying each circuit with voltage from a current source having a voltage proportional to the anode-supply applied to said valves respectively.

CARL PETTERSON.

No references cited.